US005818876A

United States Patent [19]
Love

[11] Patent Number: 5,818,876
[45] Date of Patent: Oct. 6, 1998

[54] METHOD AND APPARATUS OF ADAPTIVE MAXIMUM LIKELIHOOD SEQUENCE ESTIMATION USING A VARIABLE CONVERGENCE STEP SIZE

[75] Inventor: Robert Tristan Love, Hoffman Estates, Ill.

[73] Assignee: Motorola, Inc., Schaumburg, Ill.

[21] Appl. No.: 11,912

[22] Filed: Feb. 1, 1993

[51] Int. Cl.$^6$ .................................................. H03D 1/00
[52] U.S. Cl. .......................... 375/341; 375/341; 375/262; 329/304
[58] Field of Search .................................... 329/304, 310; 375/261, 316, 340, 341, 346, 229, 232, 233, 329, 348, 349, 350; 364/724.19, 724.2

[56] References Cited

U.S. PATENT DOCUMENTS

| | | | |
|---|---|---|---|
| 5,111,481 | 5/1992 | Chen et al. | 375/99 X |
| 5,263,033 | 11/1993 | Seshadri | 375/39 X |
| 5,272,727 | 12/1993 | Okanoue | 375/99 X |
| 5,285,480 | 2/1994 | Chennakeshu et al. | 375/94 X |

FOREIGN PATENT DOCUMENTS

| | | | |
|---|---|---|---|
| 0529585 | 8/1992 | European Pat. Off. | 375/14 |

OTHER PUBLICATIONS

J.J. Shynk et al. "The LMS Algorith With Momentum Updating", 1988 IEEE International Symposium on Circuits & Systems, Jun. 1988 pp. 2651–2654.

S. Roy et al. "Analysis of the Momentum LMS Algorithm", IEEE Transactions on Acoustics, Speech & Signal Processing, vol. 38, Iss 12 pp. 2088–2098.

*Primary Examiner*—Stephen Chin
*Assistant Examiner*—Bryan Webster

[57] ABSTRACT

A method is provided of updating an estimated channel impulse response of a maximum likelihood sequence estimator within a radio receiver (12 and 13). The method includes the steps of computing a rate of change of a channel impulse response from a current estimated channel impulse response and a previous estimated channel impulse response, selecting an update step size as a function of the rate of change of the estimated channel impulse response, and updating the estimated channel impulse response of the maximum likelihood sequence estimator based upon the selected step size. Apparatus is also provided of practicing the method in receiving and decoding a signal.

8 Claims, 3 Drawing Sheets

METHOD AND APPARATUS OF ADAPTIVE MAXIMUM LIKELIHOOD SEQUENCE ESTIMATION USING A VARIABLE CONVERGENCE STEP SIZE

FIELD OF THE INVENTION

The field of the invention relates generally to decoding of radio signals and more specifically to maximum likelihood sequence estimation.

BACKGROUND OF THE INVENTION

The effects of a radio channel upon a radio signal transmitted on the radio channel are well known. Well-known effects include poor signal quality due to adjacent and co-channel interference and multi-path propagation. A measure of poor signal quality in such cases is the ratio of carrier signal to interference signal (C/I). Where extreme distance is a factor a poor C/I may also be due to thermal noise.

Multi-path propagation due to multiple signal paths, on the other hand, produces an effect on the signal characterized by multiple copies of the signal being presented to a receiver at slightly different times and with slightly different phases. In extreme cases multiple copies of a signal may arrive at a receiver offset by a time interval comparable to the symbol period.

The problem of multi-path propagation results in a summation of signals being presented to a receiver that may bear little resemblance to the originally transmitted signal. Where either the transmitter or receiver is moving (e.g., a radio-telephone in an automobile) the problem of multi-path propagation may be further aggravated in that the effects on the signal may also vary with physical location (i.e., rapidly varying multipath dynamics including static as well as doppler shift).

Prior efforts to improve decoding of signals subject to low C/I and the effects of multi-path propagation have included adding a training and synchronization sequence to the beginning of data transmission within a frame of information and cross-correlating the received signal against the known training sequence. The results of the cross-correlation are then used to characterize and compensate for the effects of the transmission channel.

Characterization of the transmission channel leads to a determination of an estimated channel impulse response. The estimated channel impulse response information is then used to improve estimation of an originally transmitted signal from a received signal.

While characterizing the transmission channel is effective for short periods, such characterization may not be effective for frames having duration's of several milliseconds. For frames of longer duration the transmitter and receiver may change physical locations thereby changing the transmission channel and altering transmission characteristics.

Prior efforts to improve performance under such conditions have also included the system discussed in *Adaptive Maximum Likelihood Sequence Estimation for Digital Signalling in the Presence of Intersymbol Interference,* by F. R. Magee Jr. and J. G. Proakis (IEEE Transactions On Information Theory, January 1973, pgs. 120–124). The Magee and Proakis article teaches of a system using an adaptive filter in conjunction with a viterbi decoder. The values of the adaptive filter are determined by detection of a training sequence and, in effect, provide an estimated channel impulse response. Following determination of adaptive filter coefficients the coefficients are then modified based upon each new symbol output from the viterbi decoder and an adjustment parameter (update step size). The speed of convergence and accuracy of the estimate are controlled by the value of the update step size.

While the Magee and Proakis system has been effective, the convergence of the adaptive filter is dependent upon a constant step size. Where the communication channel is subject to a rapidly changing delay spread, a small step size may be inadequate to track variations in the channel. Choice of a larger step size may prove unstable or result in excessive misadjustment under conditions of low delay spread. Because of the importance of maximum likelihood sequence estimators a need exists for a method of improving the stability and convergence of maximum likelihood sequence estimators by determining an update step size based upon channel parameters.

SUMMARY OF THE INVENTION

A method is provided of updating an estimated channel impulse response of a maximum likelihood sequence estimator within a radio receiver. The method includes the steps of computing a rate of change of a channel impulse response from a current estimated channel impulse response and a previous estimated channel impulse response, selecting an update step size as a function of the rate of change of the estimated channel impulse response, and updating the estimated channel impulse response of the maximum likelihood sequence estimator based upon the selected step size. Apparatus is also provided of practicing the method in receiving and decoding a signal.

DETAILED DESCRIPTION OF THE PREFERRED EMBODIMENT

The solution to the problem of improved stability and convergence by selection of a variable step size in a maximum likelihood sequence estimator using adaptive channel estimation lies, conceptually, in comparing channel estimates over a time period and selecting a step size based upon a rate of change of the channel estimates. Such a rate of change may be expressed, in terms of slope, as a percentage of a previous or current channel impulse estimate. Selection of a step size is based upon comparison of the slope with a threshold value.

The overall communications channel can be viewed as a convolutional encoder that convolves the information data with a set of time varying channel coefficients ($h_i$). The channel can therefore be viewed as imposing a fixed pattern (in the short term) on the transmitted data. The resultant signal pattern is further corrupted by additive white Gaussian noise. The decoder must determine which data sequence, when convolved with the channel coefficients, produces a pattern which is most likely to be close to the received pattern. If the transmitted data consists of N symbols then there are $M^N$ possible data sequences, with each considered equally likely (M is a number of possible symbols in a constellation of symbols).

Given that the constellation of possible data sequences (a(i)) include values from i=1, . . . , $K=M^N$, a maximum likelihood sequence estimator (MSLE) chooses a sequence a(m) as the most likely if the expression, P(r|a(m))>P(r|a(k)), is true for the chosen sequence (a(m)) over all other possible sequences. Such a determination is based upon a minimal total error of the chosen sequence over all other sequences (minimal Euclidean distance through a viterbi trellis).

Figure 1:
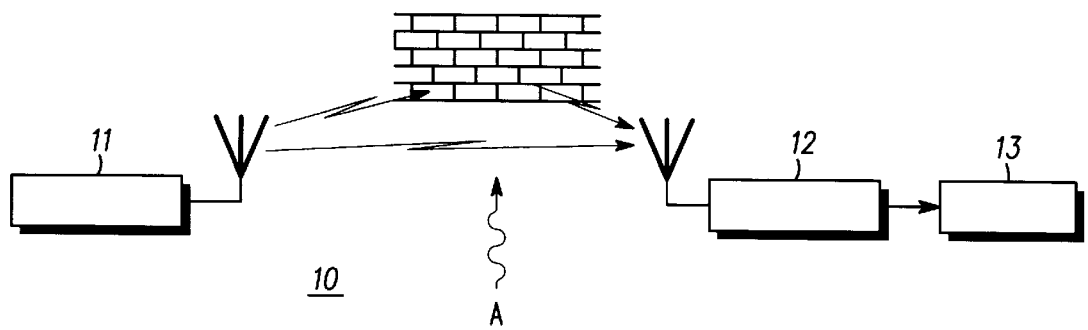
FIG. 1 comprises a communication system in accordance with the invention.

FIG. 1 is a block diagram of a radio transmission system (10). A transmitter (11) generates digital symbols from digital data and transmits such symbols for the benefit of a receiver (12). The double signal paths shown in FIG. 1 indicate that the channel between the transmitter (11) and receiver (12) introduces a time dispersion into the signal received at the receiver (12). Shown in FIG. 1 is a signal "A" which indicates a disturbance signal on the same channel as that used between transmitter (11) and receiver (12). Fading and noise also disturb the transmission.

Figure 2:
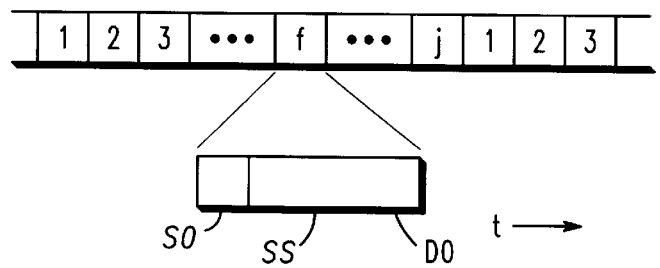
FIG. 2 depicts a TDM signal on a TDM channel.
Figure 6:
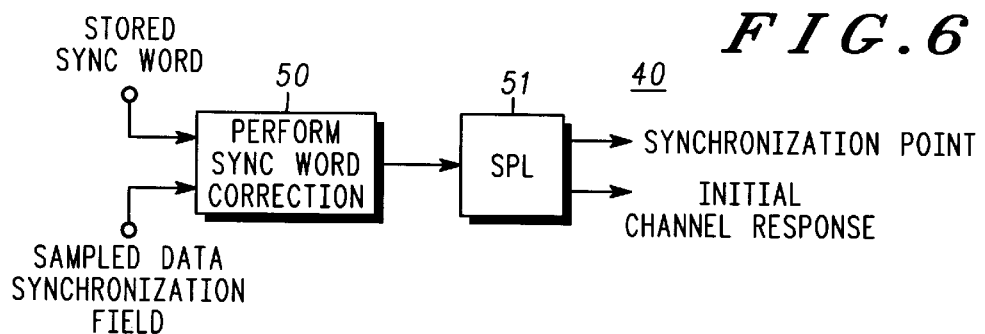
FIG. 6 is a block diagram of a max peak correlator in accordance with one embodiment of the invention.
Figure 7:
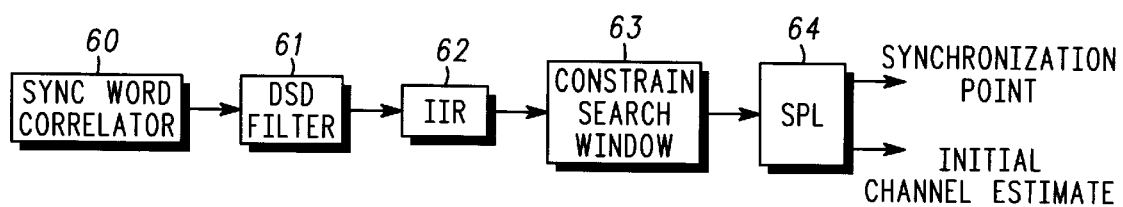
FIG. 7 comprises a block diagram of a sync word correlator using a constrained window.

The radio transmission system (10) operates under a time sharing format with separate time slots 1 to j as shown in FIG. 2 (t indicates time). A signal sequence (SS) includes a synchronizing sequence (SO) and a data sequence (DO) within each time slot "f". The signal sequence (SS) contains binary signals encoded, for instance, under a quadrature phase shift keying (QPSK) format.

The signal received at the receiver (12) is filtered and sampled to produce a received digital signal y(j) which is sent to a channel equalizer (13). The equalizer (13) delivers with a certain time delay estimated signals ŷ(j-L), which constitute an estimation of the transmitted signals S(n). (The designation (j) denotes a sampling timepoint and the designation (j-L) indicates that the estimated symbols are delayed by L sampling intervals.

Figure 3:
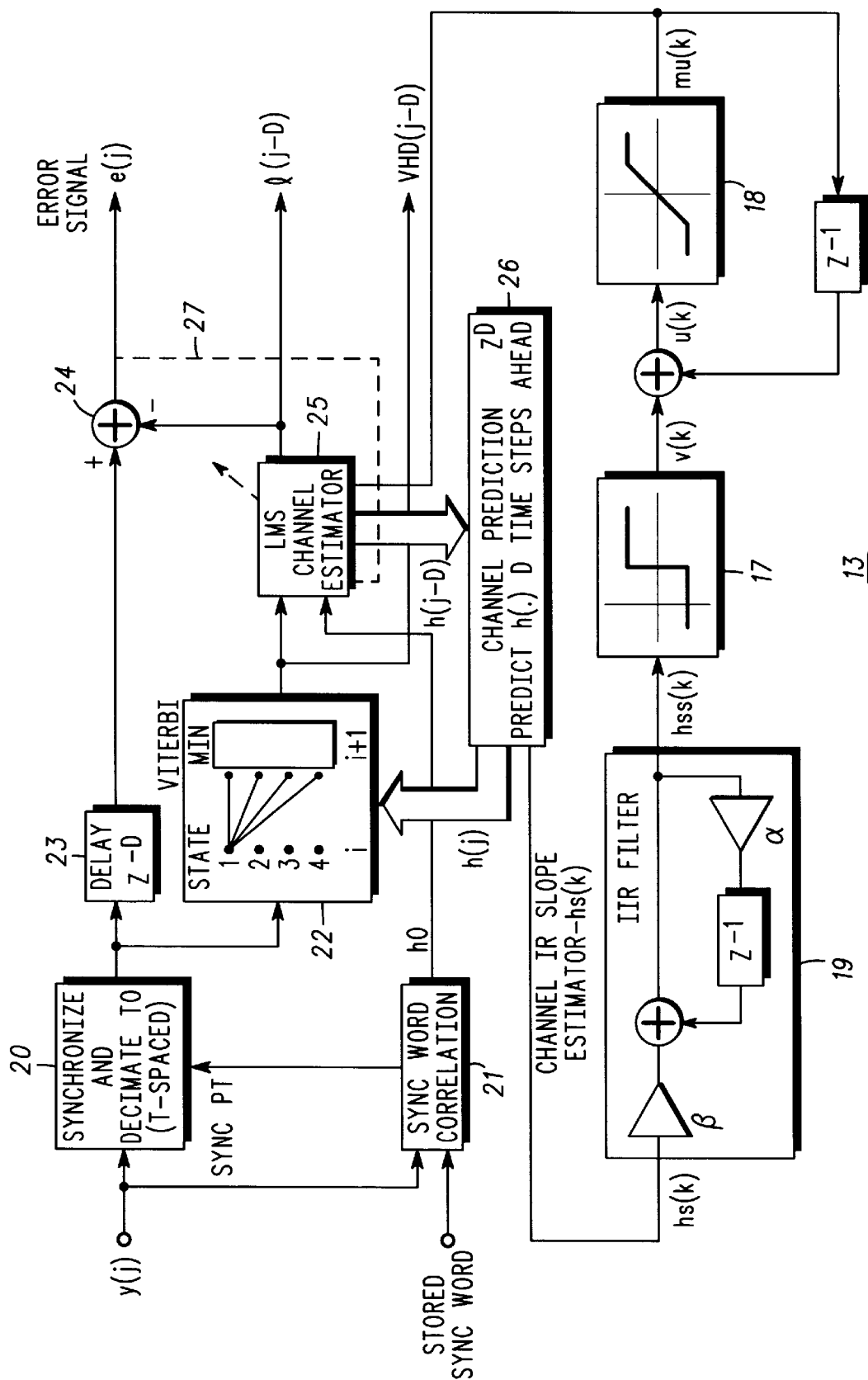
FIG. 3 comprises a block diagram of an adaptive maximum likelihood sequence estimator in accordance with the invention.

FIG. 3 is a block diagram of an adaptive maximum likelihood sequence estimator (AMLSE) (13) in accordance with one embodiment of the invention. Within the AMLSE (13) the synchronization (training) sequence of a received signal y(j) is correlated against a stored copy of the synchronization word within a synch word correlator (21) to provide a correlated output sequence, an initial channel estimate $h_o$, and a detected synchronization point. The detected synchronization point is used within a decimator (20) to decimate the oversampled received signal y(j) to an information bandwidth consistent with the transmitted signal.

The viterbi decoder (22), processing the decimated signal, may by functionally equivalent to the viterbi equalizer described in Magee. The viterbi decoder (22) receives the decimated signal and delivers the estimated symbols yHD (j-D), which are estimated in a known manner with the delay of D sampling steps, to an LMS channel estimator (25). The LMS channel estimator (25) receives the estimated symbols (yHD(j-D)) and filters them with a filter representing the current estimate of the channel impulse response in order to regenerate or estimate the channel impaired signal ŷ(j-D). An error signal e(j-D) generated by the difference is returned (dotted line 27) to the LMS channel estimator (25) and updates a current channel estimate.

Upon the receipt of a training sequence by the sync word correlator (21), the current channel estimate within the LMS channel estimator (25) is replaced with the initial channel estimate ($h_o$) generated within the synchronization correlator (21). The initial channel estimate ($h_o$) provides a relatively accurate indication of channel conditions during the transmission of the known training sequence and is an indication of changes that may have occurred within the channel environment since receipt of the previous data word.

Upon determination of a current channel estimate (h(j-D)) (based either upon an initial channel estimate ($h_o$) or upon an update through use of feedback error (e(j-D)) a channel prediction estimate (h(j)) is determined within a channel predictor (26). The channel prediction estimate (h(j)) is determined based upon changes in the current channel estimate over previous values and upon trends in the current channel estimate.

Performance of the AMLSE (13) is optimized when the decimated signal of the signal data y(j) are sampled near their maximum signal to noise ratio (SNR) and when the current channel estimate is a close reflection of actual channel conditions. The accuracy of the current channel estimate is closely related to a selected synchronization point.

The selection of a synchronization point, on the other hand, is complicated by delay spread of the sampled signal (y(j)). Delay spread, under one embodiment of the invention, is accommodated through use of a number of delay spread sensitive filters (e.g., delay spread detection (DSD) filters) and selection of the delay spread sensitive filter providing the largest filter peak. A set of synchronization point location (SPL) filter coefficients are selected based upon the identity of the selected filter. Application of the SPL filter coefficients to the correlated output provides a synchronization point and initial channel estimate that optimizes AMLSE performance within a varying delay spread environment provided by the sampled signal (y(j)).

Figure 4:
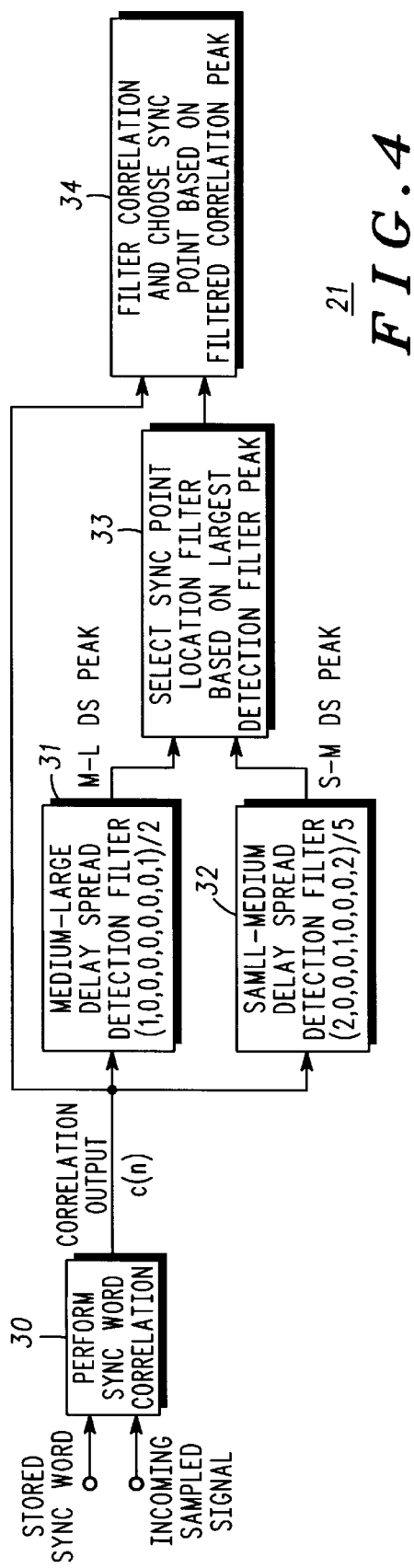
FIG. 4 comprises a block diagram of a synchronization word correlator in accordance with the invention.

By way of example, FIG. 4 is a block diagram of a synch word correlator (21), in accordance with one embodiment of the invention, using two DSD filters. Of the two DSD filters a first DSD filter (31) has indicated filter values ((1, 0, 0, 0, 0, 0, 0, 0, 1)/2) for a medium, to large, delay spread. A second DSD filter (32) has indicated filter values ((2, 0, 0, 0, 1, 0, 0, 0, 2)/5) for a small, to medium, delay spread. As above described where the first DSD filter provides the largest DSD detection filter peak, the first DSD filter (31) is selected and where the second DSD filter (32) provides the largest DSD detection filter peak, the second DSD filter (32) is selected. Coefficients for the SPL filter (33) where the first DSD filter (31) is selected are as follows: (1, 0, 0, 0, 0, 0, 0, 0, 1). Coefficients for the SPL filter (33) where the second DSD filter is selected is as follows: (32, 16, 4, 0, 0, 0, 4, 16, 32).

Within the synch word correlator (21) a sampled data synchronization field is cross-correlated with a stored synchronization word to provide a correlated output (c(n)). The correlated output (c(n)) is filtered using the medium-large DSD filter (31) and the small-medium DSD (32) filter. The magnitude of the outputs of each filter (the delay spread correlation peaks) are then compared. Based upon the identify of the largest delay spread correlation peak a set of coefficients for the SPL filter (33) are selected. The selected coefficients are then applied to the correlated output (c(n)) to provide a synchronization point and initial channel response.

After the initial channel impulse response ($h_o$) is calculated another channel impulse response (h(k)) is calculated for each output data symbol (yHD(j-D)). Upon a determination of another output data symbol (yHD(j-D)) a channel impulse response slope ($h_s(k)$) is calculated within the channel predictor (26). Channel impulse response slope has been determined to provide an indication of doppler spread within a received signal and can be used to modify an update step size of the maximum likelihood sequence estimator in accordance with an embodiment of the invention.

The channel impulse response slope is calculated by dividing a difference between a current estimated channel impulse response (h(j)) and the previous estimated channel impulse response (h(j-1)) by the current estimated channel impulse response (h(j)). The slope ($h_s(k)$) is exponentially smoothed within a one-pole infinite impulse response (IIR) filter (19) and then compared with a threshold within a threshold detector (17).

If the smoothed channel impulse response ($h_{ss}$) does not exceed the threshold value (or a second channel impulse response following the initial channel response ($h_o$) has not yet been calculated) then the step size (mu(k)) is integrated down (18) to a first, smaller update step size not exceeding a first, lower bound (lower-mu). If at least a second channel impulse response has been calculated and the slope exceeds the threshold value then the step size (mu(k)) is integrated upwards (18) not to exceed a larger, second step size bound (upper-mu).

The use of the second larger update step size within the LMS channel estimator (25) allows the LMS channel estimator (25) to converge much more rapidly under conditions of large doppler spread. The large doppler spread is detected by the slope of the smoothed channel impulse response ($h_s(k)$) exceeding the threshold stored within the threshold detector (17).

The smaller update step size is, in turn, used under conditions of small doppler spread and for the first estimated channel response following the initial channel response ($h_o$).

Figure 5:
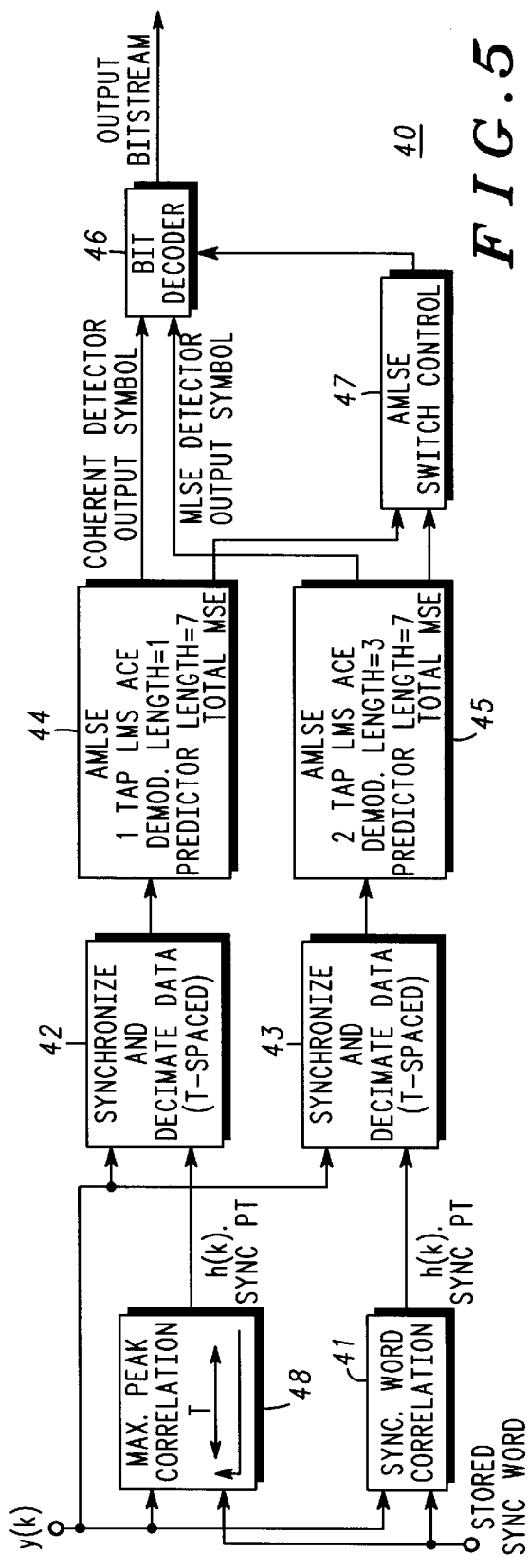
FIG. 5 comprises a block diagram of a parallel path maximum likelihood sequence estimator in accordance with the invention.

FIG. 5 is an example of an AMLSE using two parallel processing paths. Two processing path has been determined to provide additional benefits in terms of speed of convergence by matching each path to different rates of doppler spread.

The first processing path (41, 43, and 45) is functionally equivalent to the above described AMLSE (13, FIGS. 3 and 4) with block 41 corresponding to block 21, block 43 corresponding to block 20 and block 45 corresponding to blocks 22, 23, 24, 25, and 26. Within the second processing path (48, 42, and 44), block 42 is functionally equivalent to block 20 and block 44 corresponds to blocks 22, 23, 24, 25, and 26.

In the second processing path (48, 42, and 44) the synch word correlator (21) is replaced with a max peak correlator (48). Contained within the max peak correlator (48) is a sync word correlator (50) and an alternate type of delay spread sensitive filter (SPL filter (51)). The filter coefficients of the SPL filter (48) have been selected (with tap values of (1, 0, 0, 0, 0, 0, 0, 0)) to provide a maximum output upon conditions of flat delay.

In operation the max peak correlator (48) correlates the sampled data synchronization field with the stored synchronization word to provide a correlated output. The correlated output is then convolved with the SPL filter (51) to provide a synchronization point and an initial channel response. The synchronization point is then used as described above to decimate the data synchronization field. The decimated data synchronization field is then subjected to maximum likelihood decoding as described above using the initial channel response.

Under condition of flat fading it has been determined that an SPL filter (51) used in conjunction with a sync word correlator (50) provide superior results. When the SPL filter (51) is used in the form of a second processing path with the above described AMLSE (13) the combination further improves overall bit error rate (BER) within a communication system.

The outputs of the two signalling paths (FIG. 5) are supplied to a bit decoder (46) and an AMLSE switch control (47). The AMLSE switch control (47) compares mean square error estimates of each signal path and selects the path providing the least error. Upon selection of the signal path the AMLSE switch control (47) activates the bit decoder (46) to decode the signal from the path providing the least error.

In another embodiment of the invention a constrained search window (63) is used within the sync word correlator (41) to further improve the performance of the AMLSE (40). Under such an embodiment a delay spread correlation peak is selected by repeated filtering and a constrained window defined by a range ahead of and after a synchronization point. The range ahead of the initial synchronization point is selected to have an integral number of sample intervals (e.g., one sample interval, $T_s$). The range after the initial synchronization point is selected as having a time value commensurate with the duration of the channel impulse response due to delay spread and relative to the initial synchronization point. (In practice the range would be from the initial synchronization point to a point occurring $T/(2T_s)$ sample intervals later, where T is a symbol interval and $T_s$ is a sampling rate.)

The delay spread correlation peak is determined by DSD filtering (61) the correlated output sequence of the sync word correlator (60) with a DSD filter value (1, 1, 1, 1, 1, 1, 1, 1, 1) designed to provide a general location of a synchronization point. The output of the DSD filter (61) is then filtered using an infinite impulse response (IIR) (62) for more precise determination of the synchronization point.

Following determination of a constrained window (63) a signal within the constrained window is subject to a synchronization point location filter (e.g., with tap values of (32, 16, 4, 0, 0, 0, 4, 16, 32)) to define a synchronization point and initial channel response through the second signal path. A maximum likelihood sequence estimation hypothesis is then determined as described above using the calculated synchronization point and initial channel response values. Determination of the hypothesis with the lowest BER is as above wherein the AMLSE switch control (47) selects the hypothesis with the lowest level of mean square error.

In another embodiment of the invention the constrained search window and more precisely determined synchronization point is used under a previous embodiment as in input to DSD filters (31 and 32), and SPL filter (33) within the second maximum likelihood sequence estimator signal processing path. Under such an embodiment the first maximum likelihood sequence estimator signal processing path (through use of the max peak correlator (48)) provides improved BER performance for flat fading. The second maximum likelihood sequence estimator signal processing path provides improved BER performance for other than flat fading.

In another embodiment of the invention an update step size is chosen as a function of a rate of change of the estimated channel impulse response. Selection of the update step size under such an embodiment is based upon a comparison of a current rate of change of the current estimated channel impulse response against a maximum rate of change of the estimated channel impulse response stored within a memory to provide a proportionality factor. The proportionality factor is then multiplied by a maximum allowable step size to determine a step size that is a function of the rate of change of the estimated channel impulse response.

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art (such as parallel processing paths using a combination of AMLSE elements), it is not desired to limit the invention to the exact construction and operation illustrated and described, and accordingly all suitable modifications and equivalents may be, resorted to, falling within the scope of the invention.

It is, of course, to be understood that the present invention is, by no means, limited to the specific showing in the drawing, but also comprises any modification within the scope of the appended claims.

I claim:

1. An apparatus for updating an estimated channel impulse response of a maximum likelihood sequence estimator within a radio receiver using adaptive channel estimation comprising: means for computing a rate of change of a channel impulse response from a current estimated channel impulse response and a previous estimated channel impulse response; means for comparing the rate of change of the channel impulse response slope with a threshold and selecting a first update step size when the channel impulse slope does not exceed the threshold and a second update step size when the rate of change of the channel impulse response exceeds the threshold; means for updating the estimated channel impulse response of the maximum likelihood sequence estimator based upon the selected step size.

2. The apparatus of claim 1 further comprising means for exponentially smoothing the rate of change of the channel impulse response before comparing with the threshold.

3. The apparatus of claim 1 further comprising means for updating the estimated channel impulse response after each symbol output from the maximum likelihood sequence estimator.

4. A method of updating an estimated channel impulse response of a maximum likelihood sequence estimator within a radio receiver, the method comprising the steps of:

receiving a first symbol within the radio receiver;

estimating, within the radio receiver, a channel impulse response of the first symbol within a maximum likelihood sequence estimator based on a first step size;

receiving a second symbol within the radio receiver;

estimating, within the radio receiver, a channel impulse response of the second symbol within a maximum likelihood sequence estimator based on the first step size;

calculating a change in channel impulse response between the first and the second estimations of channel impulse responses to create a change in channel impulse response;

updating, within the receiver, the first step size to create a second step size based on the change in channel impulse response;

receiving a third symbol within the radio receiver; and estimating, within the radio receiver, a channel impulse response of the third symbol within a maximum likelihood sequence estimator based on a second step size.

5. The method of claim 4 further comprising the step of exponentially smoothing the change in channel impulse response and updating the first step size to create a second step size based on the changed channel impulse response.

6. A method of updating an estimated channel impulse response of a maximum likelihood sequence estimator within a radio receiver, the method comprising the steps of:

receiving a first symbol within the radio receiver;

estimating, within the radio receiver, a channel impulse response of the first symbol within a maximum likelihood sequence estimator based on a first step size;

receiving a second symbol within the radio receiver;

estimating, within the radio receiver, a channel impulse response of the second symbol within a maximum likelihood sequence estimator based on the first step size;

calculating a change in channel impulse response between the first and the second estimations of channel impulse responses;

updating, within the receiver, the first step size to create a second step size based on the change in channel impulse response, wherein the second step size does not exceed a first bound when the rate of change does not exceed a threshold, and the second step size does not exceed a second bound when the rate of change exceeds the threshold;

receiving a third symbol within the radio receiver; and estimating, within the radio receiver, a channel impulse response of the third symbol within a maximum likelihood sequence estimator based on a second step size.

7. The method of claim 6 further comprising the step of exponentially smoothing the change in channel impulse response and updating the first step size to create a second step size based on the changed channel impulse response.

8. A method of updating an estimated channel impulse response of a maximum likelihood sequence estimator within a radio receiver, the method comprising the steps of:

receiving a first symbol within the radio receiver;

estimating, within the radio receiver, a channel impulse response of the first symbol within a maximum likelihood sequence estimator based on a first step size;

receiving a second symbol within the radio receiver;

estimating, within the radio receiver, a channel impulse response of the second symbol within a maximum likelihood sequence estimator based on the first step size;

calculating a change in channel impulse response between the first and the second estimations of channel impulse responses;

exponentially smoothing the change in channel impulse response;

updating, within the receiver, the first step size to create a second step size based on the exponentially smoothed change in channel impulse response;

receiving a third symbol within the radio receiver; and estimating, within the radio receiver, a channel impulse response of the third symbol within a maximum likelihood sequence estimator based on a second step size.

* * * * *